US011555911B2

(12) United States Patent
Brandao

(10) Patent No.: US 11,555,911 B2
(45) Date of Patent: Jan. 17, 2023

(54) INTERFERENCE LIMITING FOR SURVEILLANCE MESSAGES

(71) Applicant: Honeywell International Inc., Morris Plains, NJ (US)

(72) Inventor: Ruy C. Brandao, Redmond, WA (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/892,029

(22) Filed: Jun. 3, 2020

(65) Prior Publication Data

US 2020/0389193 A1  Dec. 10, 2020

Related U.S. Application Data

(60) Provisional application No. 62/858,832, filed on Jun. 7, 2019.

(51) Int. Cl.
| | |
|---|---|
| H04B 1/04 | (2006.01) |
| H04B 1/38 | (2015.01) |
| G01S 13/76 | (2006.01) |
| G01S 7/02 | (2006.01) |
| G01S 13/91 | (2006.01) |
| G08G 5/00 | (2006.01) |

(Continued)

(52) U.S. Cl.
CPC ............ *G01S 13/765* (2013.01); *G01S 7/023* (2013.01); *G01S 13/762* (2013.01); *G01S 13/91* (2013.01); *G08G 5/0004* (2013.01); *H04B 1/0475* (2013.01); *H04B 1/1027* (2013.01); *H04B 1/3822* (2013.01); *H04B 2001/0416* (2013.01)

(58) Field of Classification Search
None
See application file for complete search history.

(56) References Cited

U.S. PATENT DOCUMENTS

| | | |
|---|---|---|
| 5,220,329 A | 6/1993 | Verbeke, Jr. et al. |
| 6,313,783 B1 | 11/2001 | Kuntman et al. |

(Continued)

FOREIGN PATENT DOCUMENTS

| | | |
|---|---|---|
| CN | 103682558 | 3/2014 |
| WO | 201935924 A1 | 2/2019 |

OTHER PUBLICATIONS

U.S. Department of Transportation, "Introduction to TCAS II," Version 7.1, HQ-111358, Feb. 28, 2011, 50 pp.

(Continued)

*Primary Examiner* — Pablo N Tran
(74) *Attorney, Agent, or Firm* — Shumaker & Sieffert, P.A.

(57) ABSTRACT

In some examples, a system includes a transceiver configured to transmit a first surveillance message at a first power level at or below a first maximum power level. The system also includes processing circuitry coupled to the transceiver, the processing circuitry configured to determine that a threshold condition exists. The processing circuitry is also configured to determine a second maximum power level in response to determining that the threshold condition exists, where the second maximum power level is lower than the first maximum power level. The transceiver is configured to transmit, in response to the processing circuitry determining that the threshold condition exists, a second surveillance message at a second power level, wherein the second power level is at or below the second maximum power level.

12 Claims, 7 Drawing Sheets

(51) Int. Cl.
*H04B 1/10* (2006.01)
*H04B 1/3822* (2015.01)

(56) References Cited

U.S. PATENT DOCUMENTS

| | | | |
|---|---|---|---|
| 6,483,453 | B2 | 11/2002 | Oey et al. |
| 6,657,578 | B2 | 12/2003 | Stayton et al. |
| 7,158,073 | B2 | 1/2007 | Ybarra |
| 7,436,350 | B1 | 10/2008 | Maloratsky et al. |
| 7,619,557 | B2 | 11/2009 | Billaud et al. |
| 8,738,064 | B2 | 5/2014 | Hofmann et al. |
| 9,100,087 | B2 | 8/2015 | Stayton |
| 9,869,745 | B1 | 1/2018 | Rowlan |
| 9,997,826 | B2 | 6/2018 | Oey |
| 10,132,923 | B2 | 11/2018 | Robin |
| 10,451,725 | B2 * | 10/2019 | Kirk ................... G01S 13/931 |
| 10,795,016 | B2 * | 10/2020 | Hauswald ............ G01S 13/781 |
| 11,041,950 | B2 * | 6/2021 | Troxel ................. G01S 13/933 |
| 11,156,708 | B2 * | 10/2021 | McCullen ............ G01S 7/4034 |
| 2018/0137765 | A1 * | 5/2018 | Sindlinger ........... G08G 5/0052 |
| 2018/0321370 | A1 | 11/2018 | Robin |
| 2019/0061693 | A1 * | 2/2019 | Johnson ............... B60R 25/33 |
| 2019/0162841 | A1 * | 5/2019 | Peckham .............. G01S 1/685 |

OTHER PUBLICATIONS

U.S. Appl. No. 16/568,708, by Honeywell International Inc. (Inventors: Ferguson et al.), filed Sep. 12, 2019.
U.S. Appl. No. 16/850,343, by Honeywell International Inc. (Inventors: Brandao et al.), filed Apr. 16, 2020.
Williamson et al., "Development and Operation of the Traffic Alert and Collision Avoidance System (TCAS)," 8078 Proceedings of the IEEE, vol. 77, No. 11, Nov. 1989, 10 pp.
Sections 2.2.3.4 through 2.2.3.6.4 of Radio Technical Commission for Aeronautics DO-185B, Jun. 19, 2008, 7 pp.
Communication enclosing extended European Search Report from counterpart European Application No. 20178624.1, dated Oct. 28, 2020, 8 pp.
U.S. Appl. No. 16/949,690, filed Nov. 11, 2020, naming inventors Brandao et al.
Response to European Search Report dated Oct. 28, 2020, from counterpart European Patent Application No. 20178624.1, filed on Mar. 31, 2021, 7 pp.
Communication pursuant to Article 94(3) EPC from counterpart European Application No. 20178624.1 dated Nov. 4, 2022, 7 pp.

* cited by examiner

INTERFERENCE LIMITING FOR SURVEILLANCE MESSAGES

This application claims the benefit of U.S. Provisional Patent Application No. 62/858,832 (filed Jun. 7, 2019), the entire content being incorporated herein by reference.

TECHNICAL FIELD

This disclosure relates to position reporting for vehicles.

BACKGROUND

A vehicle may report the position of the vehicle to other vehicles and traffic systems. For example, an aircraft may include equipment for sending Traffic Collision Awareness System (TCAS) messages. The TCAS equipment can send interrogation messages to other aircraft at a frequency of 1030 MHz. A transponder on another aircraft can also receive interrogation messages from other TCAS equipment and reply with a TCAS message at a frequency of 1090 MHz indicating the position of the aircraft.

TCAS II equipment is required to perform interference limiting. When the aircraft is in a high-traffic area, the aircraft can perform interference limiting by reducing the rate and power of the TCAS transmissions below defined interference limits. The estimate of the number of TCAS equipped aircraft within a certain range of ownship is used to determine the "defined interference limits". The ownship aircraft can perform interference limiting based on an estimate of the number of other TCAS equipped aircraft in the vicinity of the ownship aircraft.

SUMMARY

In general, this disclosure relates to systems, devices, and techniques for determining a maximum power level for transmitting a surveillance message by a transceiver on an ownship vehicle. A transceiver can transmit surveillance messages at or below a first maximum power level until a threshold condition is detected. In response to determining that a threshold condition exists, processing circuitry can determine a second maximum power level that is less than the first maximum power level. The second maximum power level may also be less than a maximum power level determined according to interference limiting standards. Example parameters that can be used for determining that existence of a threshold condition include the speed of the ownship vehicle, the altitude of the ownship vehicle, the geographic location of the ownship vehicle, the speed of nearby vehicles.

The details of one or more examples of the disclosure are set forth in the accompanying drawings and the description below. Other features, objects, and advantages will be apparent from the description, drawings, and claims.

DETAILED DESCRIPTION

Various examples are described below for reducing the interference caused by surveillance messages based on the existence of a threshold condition. Using the techniques of this disclosure, a transceiver can reduce the rate and/or power of transmitting surveillance messages in response to determining that a threshold condition exists, even when the interference limiting standards do not mandate a reduction in power. A system can also increase a minimum trigger level used to filter received surveillance signals, which effectively reduces the sensitivity of the receiver.

Figure 1:
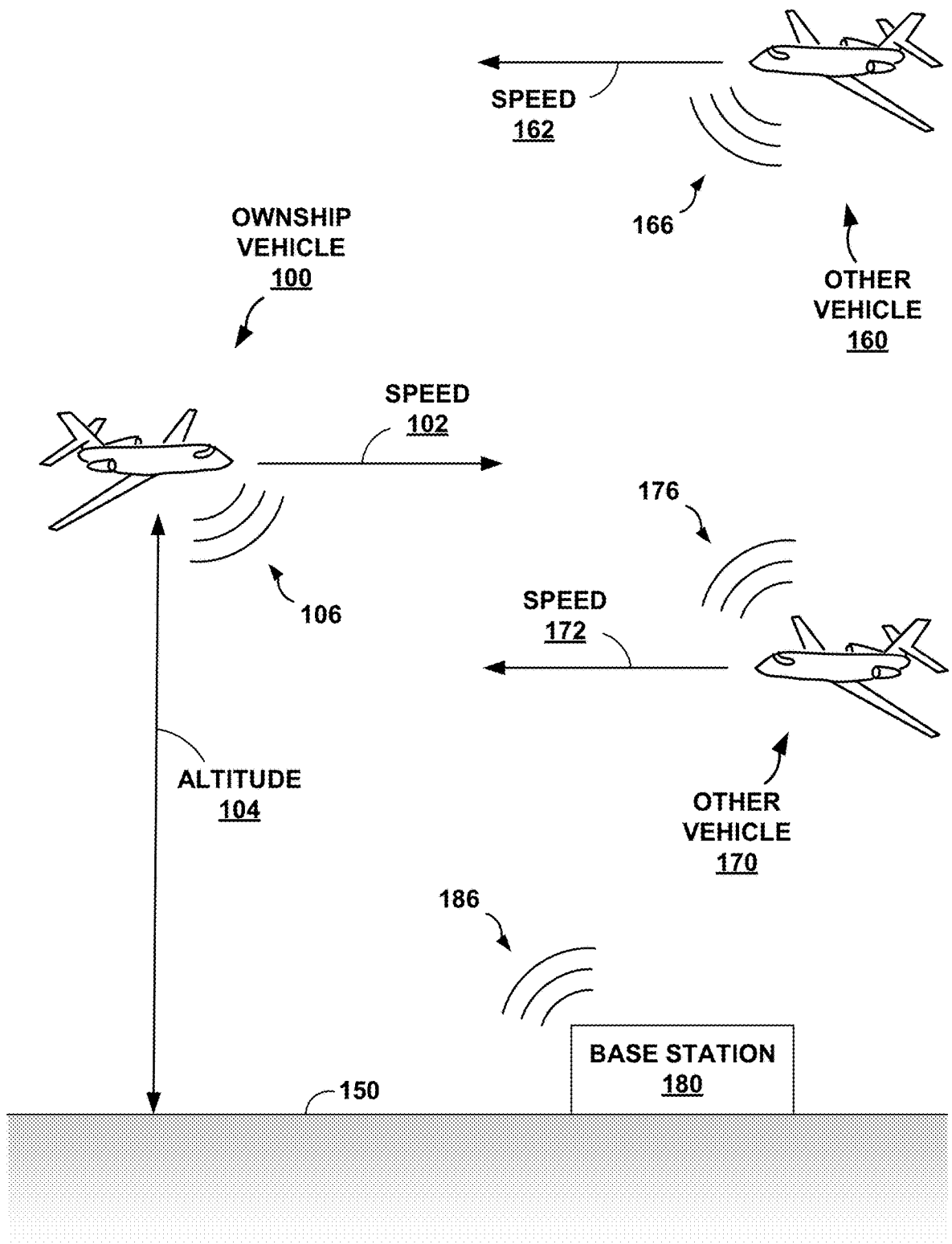
FIG. 1 is a conceptual block diagram of three vehicles sending and receiving surveillance messages, in accordance with some examples of this disclosure.

FIG. 1 is a conceptual block diagram of three vehicles 100, 160, and 170 sending and receiving surveillance messages 106, 166, and 176, in accordance with some examples of this disclosure. Base station 180 can also send and receive surveillance messages 186 in communication with vehicles 100, 160, and 170. Vehicle 100 is referred to as the "ownship vehicle," because FIG. 1 is described from the perspective of a system of this disclosure mounted onboard vehicle 100.

Although vehicles 100, 160, and 170 are depicted in FIG. 1 as airplanes, vehicles 100, 160, and 170 can be any other vehicle or non-vehicle mobile object. In some examples, vehicles 100, 160, and 170 may be an aircraft other than an airplane, such as a helicopter or a weather balloon. Vehicles 100, 160, and 170 may be space vehicles such as satellites or spaceships. In yet other examples, Vehicles 100, 160, and 170 may be land vehicles such as automobiles or water vehicles such as ships or submarines. Vehicles 100, 160, and 170 can be manned vehicles or unmanned vehicles, such as drones, remote-control vehicles, or any suitable vehicle without any pilot or crew on board.

Base station 180 can be any entity based on ground surface 150 that transmits and/or receives surveillance messages. Base station 180 can also be a marine or an airborne entity. Base station 180 may aggregate and distribute position and velocity data for vehicles 100, 160, and 170.

Vehicle 100 is configured to determine the location and speed 102 of vehicle 100, including altitude 104. Vehicles 160 and 170 can also determine their locations and speeds 172 and 174. Each of vehicles 100, 160, and 170 may include a Global Navigation Satellite System (GNSS), an inertial navigation system (INS) for determining a turn rate, velocity, and acceleration for the respective vehicle 100, 160, or 170. Each of vehicles 100, 160, and 170 may include an altimeter, an accelerometer, an attitude and heading reference system, and/or other sensors and means for determining velocity and other parameters of the respective vehicle 100, 160, or 170.

Vehicles 100, 160, and 170 can transmit surveillance messages 106, 166, and 176 indicating the locations and speeds 102, 162, and 172 of vehicles 100, 160, and 170. Surveillance messages 106, 166, and 176 may include interrogation messages, periodic, unprompted broadcasts, and/or replies to interrogation messages received from vehicles 100, 160, and 170 and/or base station 180. The surveillance signals can include any form of positioning reporting signals, including Traffic Alert and Collision Avoidance System (TCAS), transponder messages, automatic-dependent surveillance—broadcast (ADS-B), automatic identification system (AIS), and/or any other type of position reporting. TCAS and transponder may be separate units or may be combined into an integrated unit.

The standard frequency for the transmission of TCAS interrogation messages is 1030 MHz, and the standard frequency for TCAS reply messages and TCAS broadcast messages is 1090 MHz. Thus, TCAS equipment transmits interrogations at 1030 MHz and listens and/or receives messages at 1090 MHz, while the transponder receives the interrogations at 1090 MHz and listens and/or receives messages at 1030 MHz. Thus, the TCAS equipment and the transponder are complementary. The standard frequency for ADS-B messages is 1090 MHz.

When an excessive number of transmitting vehicles (e.g., TCAS aircraft) exist in an area, the surveillance systems of these vehicles may cause an excessive amount of interrogations and replies. These excessive transmissions and replies may degrade the ability of transponders to reply to the secondary surveillance interrogations of air traffic control radars. In addition, excessive transmissions and replies may degrade the ability of transponders to reply to the interrogations (e.g., TCAS interrogations) of other vehicles. Each transmission limits the range of the other transceivers in the area and therefore acts as a penalty on other transceivers. For example, vehicle 100 may not quickly or accurately identify vehicle 160 because vehicle 100 may not be able to identify the surveillance messages from vehicle 160 because of all of the signals received at the standard frequency for the surveillance messages.

The presence of multiple vehicles equipped with transceivers such as TCAS or similar devices results in increased interrogations and replies, which causes signal interference. The interference is the result of multiple mechanisms. Upon detecting an interrogation signal, a receiving vehicle's transponder is suppressed while determining whether to generate a reply signal to the received interrogation. The interference of overlapping interrogations may garble or corrupt a receiver's ability to correctly receive and decode and interrogation. Another cause of interference is that the increased number of replies to multiple interrogators may corrupt or garble a reply, thereby preventing a receiver from successfully receiving and decoding a message.

Yet another form of interference is caused by TCAS and a collocated ownship transponder. Pulsed L-Band avionics (e.g., TCAS, transponder, distance measuring equipment (DME)) are normally connected to a suppression bus. Any time that one of those systems transmits, the transmitting system informs the other systems on the bus not to transmit or that the receive capability will be degraded. Degradation can occur when the frequency bands of multiple systems are in close proximity. When a TCAS system transmits, the TCAS system suppresses the onboard transponder from either detecting an interrogation or replying to a detected interrogation. The aviation industry refers to the cause of this interference as "Mutual Suppression."

One approach that is required by some interference limiting standards is for vehicle 100 to count the number of TCAS-equipped vehicles in the area and reduce the transmission power and/or rate by vehicle 100 to reduce the interference at the standard frequency. This approach is based on an estimate of the number of nearby vehicles, which may not be accurate when there are several nearby transmitting creating interference. Some jurisdictions may set forth interference limiting standards for reducing transmission power based on parameters such as the number of vehicles near the ownship vehicle. For example, TCAS Minimum Operational Performance Standards (MOPS), International Civil Aviation Organization (ICAO) Airborne Collision Avoidance System (ACAS) Standards and Recommended Practices (SARPs), and/or Federal Aviation Administration Technical Standards Orders (TSOs), such as TSO-C119c, -C119e, and -C219, can provide interference limiting standards for reducing power. In addition, the Radio Technical Commission for Aeronautics (RTCA) has issued interference limiting standards in DO-185 and DO-385. In Europe, the European Technical Standards Orders issued by the European Aviation Safety Agency can provide interference limiting standards for reducing power.

In accordance with the techniques of this disclosure, vehicle 100 can reduce the transmission power and/or rate in response to determining a threshold condition, even when the interference limiting guidelines or standards do not suggest or mandate a reduction in power. Vehicle 100 can reduce the transmission power by reducing the maximum power level for the transmission of surveillance messages. Vehicle 100 can determine that a threshold condition exists to detect when high transmission power or high transmission rate is either not needed and/or may increase the interference beyond an acceptable level. The threshold condition may be related to the speed, altitude, or geographic region of vehicle 100. The threshold condition may also be related to speeds 162 and 172 of vehicles 160 and 170.

Vehicle 100 can also increase a minimum trigger level used to filter received signals for surveillance messages in response to determining that a threshold condition exists. Increasing the minimum trigger level for received signals decreases the receiver sensitivity. The minimum trigger level may include a power threshold expressed in watts or dBm above which an acquisition sequence is initiated. As an example, the nominal minimum trigger level for a TCAS is negative 74 dBm. In some examples, vehicle 100 can increase the minimum trigger level to, for example, negative 72 dBm or negative 68 dBm based on the interference limiting standards. Increasing the minimum trigger level may result in vehicle 100 not detecting surveillance messages (e.g., Mode S acquisition squitters) originating from far-away sources, which prevents unnecessary interrogations by vehicle 100 of the far-away aircraft.

Vehicle 100 can reduce the maximum power level for surveillance messages 106 or increase the minimum trigger level for received signals in response to determining that speed 102 of vehicle 100 is less than a threshold speed. At lower speeds, the closure rate for vehicle 100 with respect to other vehicles 160 and 170 is lower. Therefore, vehicle 100 does not need to communicate with vehicles that are very far away from vehicle 100 because there is a lower chance of a collision with far-away vehicles, as compared to when vehicle 100 is travelling at a higher speed.

The "power level" of surveillance messages 106 may refer to the total radiated power of surveillance message 106 over a period of time. For example, vehicle 100 transmits surveillance message 106 as an interrogation message at a rate of once per second. The total radiated power may be equal to the power for an individual interrogation. In general, the standard interference limiting algorithms may specify a limit on the sum of the total radiated output power for each second of all transmissions. The interference limiting algorithm may provide a limit for the maximum power of any individual tracking transmission. Thus, vehicle 100 can reduce the power level of surveillance messages 106 by reducing the power of each interrogation or by increasing the time between transmissions (e.g., by reducing the interrogation rate). The maximum power level established by vehicle 100 may apply to all future messages sent by vehicle 100, until circumstances change.

Vehicle 100 can reduce the maximum power level for surveillance messages 106 or increase the minimum trigger level for received signals in response to determining that altitude 104 of vehicle 100 is less than a threshold altitude. At lower altitudes (below ten or fifteen thousand feet), vehicle 100 is likely to be travelling at slower speeds, which means a lower closure rate. Moreover, nearby vehicles 160 and 170 traveling at lower altitudes are also likely to be traveling at slowed speeds. Thus, altitude 104 can be used as a proxy for speed 102. If vehicle 160 is nearby but at a much higher altitude than vehicle 100, then vehicle 160 presents a lower risk of collision, assuming that vehicles 100 and 160 are traveling parallel to ground surface 150.

Moreover, vehicles 100, 160, and 170 may be subject to speed restriction below the threshold altitude. For example, the speed limit for aircraft flying under ten thousand feet of altitude in the United States is two hundred and fifty nautical miles per hour (knots). Thus, if altitude 104 is less than ten thousand feet, vehicles higher than ten thousand feet less likely to present a collision threat. Vehicle 100 can assume with high likelihood that other vehicles that may present a collision threat are traveling at less than two hundred and fifty knots, and vehicle 100 can reduce the transmission power or rate or increase the minimum trigger level for received signals without compromising safety.

In some examples, the transmission power may be equal to the sum of the total radiated power of each transmissions in a given time period. For example, each transmission may be an interrogation message, and there may be a number of interrogations in the given time period. The total radiated power over a time period may be equal to the power of each interrogation that occurs in the time period.

Vehicle 100 can reduce the maximum power level for surveillance messages 106 or increase the minimum trigger level for received signals in response to determining that vehicle 100 is located in a particular geographic region. For example, the speed limit for aircraft flying under ten thousand feet of altitude in the United States is two hundred and fifty knots. Thus, if altitude 104 is less than ten thousand feet, vehicle 100 can assume with high likelihood that other vehicles that may present a collision threat are traveling at less than two hundred and fifty knots because of the speed limit. Other jurisdictions may not have any speed limit at low altitudes, and some jurisdictions may have a different speed limit and/or a different threshold altitude than the United States.

Vehicle 100 can reduce the maximum power level for surveillance messages 106 or increase the minimum trigger level for received signals in response to determining that speeds 162 and 172 of vehicles 160 and 170 are less than a threshold speed, which may be different than the threshold speed for vehicle 100. In some examples, vehicle 100 may compare the maximum speed or vehicles 160 and 170, or the maximum speed of the vehicles in the same altitude range as vehicle 100, to the threshold speed. Speeds 162 and 172 affect the closure rate between vehicles 100 and 160 and between vehicles 100 and 170, so vehicle 100 can transmit at a lower power and/or a lower rate without compromising safety. In some examples, vehicle 100 can compare the average of the speeds of all nearby vehicles or a particular percentile ranking (e.g., $60^{th}$, $75^{th}$, or $80^{th}$ percentile) of the speeds of all nearby vehicles to the threshold speed. Vehicle 100 can determine the speeds of vehicles 160 and 170 based on surveillance messages 166 and 176 (e.g., ADS-B messages) received from vehicles 160 and 170.

In examples in which vehicle 100 uses the speeds of nearby vehicles, vehicle 100 can establish a radius around vehicle 100. Vehicle 100 can classify any vehicle within the radius as nearby. In some examples, vehicle 100 can establish a different shape that is based on the direction of travel of vehicle 100 (e.g., a circle or sphere shifted with the center ahead of vehicle 100). Vehicle 100 can establish the radius based on speed 102, such that a higher speed results in a larger radius.

Reducing the rate or power of transmissions in response to determining that a threshold condition exists can reduce interference with other surveillance messages at the frequency of the surveillance messages. Reducing the rate or power of transmissions may also reduce the power consumption of the transceiver. In addition, by reducing transmission power when the interference limiting standards do not mandate any reduction, or by reducing more than the reduction mandated by the interference limiting standards, vehicle 100 may have a reduced impact on vehicles 160 and 170. In examples in which vehicle 100 sends fewer interrogations, vehicles 160 and 170 may spend less time suppressing the transmitters onboard vehicles 160 and 170, which allows for the transmitters onboard vehicles 160 and 170 to reply to other interrogators.

In addition, when the closure rate of vehicle 100 is high, vehicle 100 may be configured to transmit at a power level that is above the maximum power level mandated by the interference limiting standards. Transmitting at a higher power level than the level mandated by the interference limiting standards may promote the safety of vehicles 100, 160, and 170 by ensuring a sufficient surveillance range.

Figure 2:
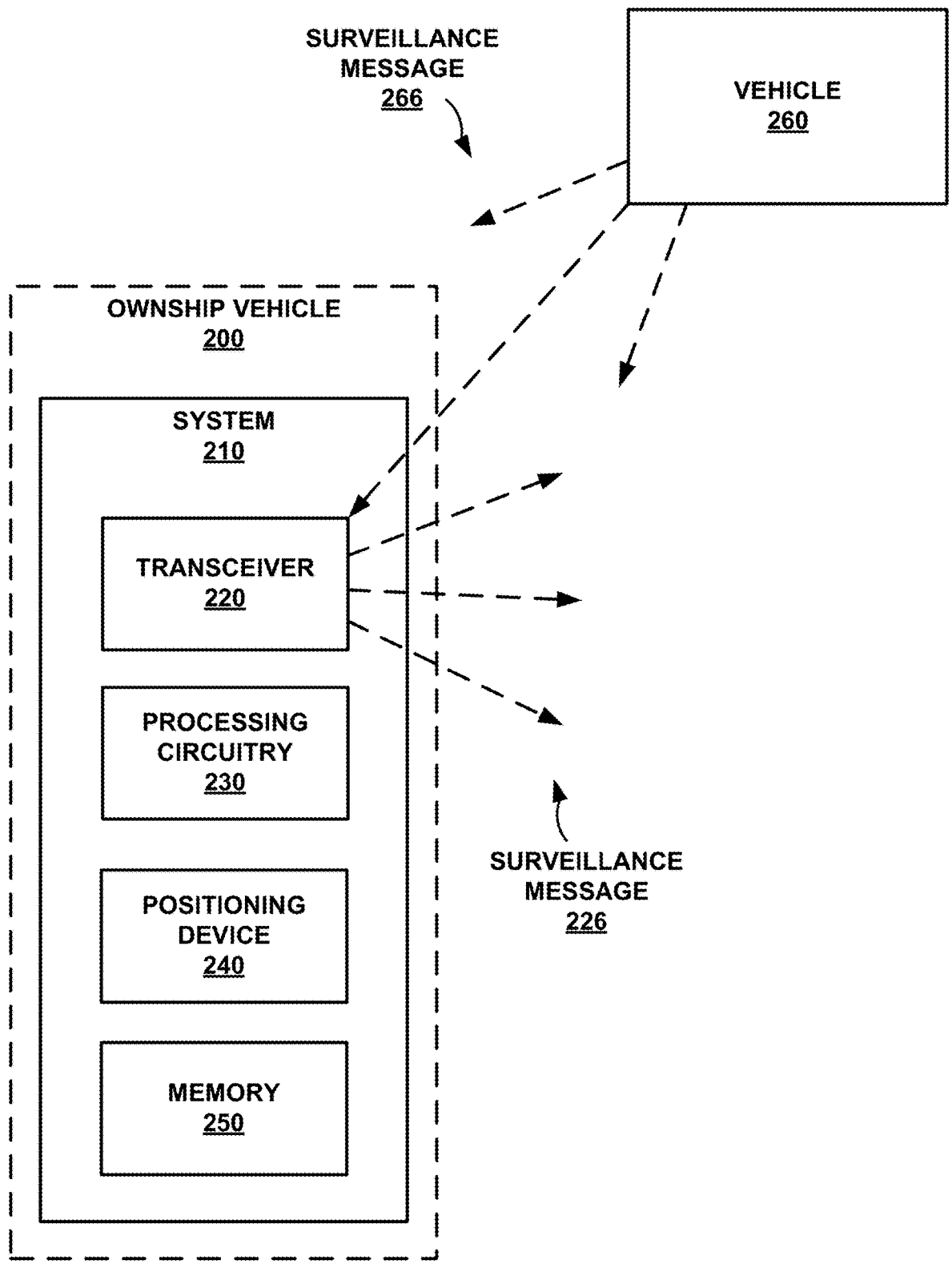
FIG. 2 is a conceptual block diagram of a system including processing circuitry and a transceiver, in accordance with some examples of this disclosure.

FIG. 2 is a conceptual block diagram of a system 210 including processing circuitry 230 and a transceiver 220, in accordance with some examples of this disclosure. Vehicle 200 is referred to as the "ownship vehicle." System 210 includes transceiver 220, processing circuitry 230, positioning device 240, and memory 250. System 210 may include additional elements not shown in FIG. 2, such as an altimeter, an accelerometer, an attitude and heading reference system, and/or other sensors and means for determining velocity and other parameters of vehicle 200. Although FIG. 2 shows transceiver 220, processing circuitry 230, positioning device 240, and memory 250 as separate components for ease of illustration, these components may be separate or highly integrated in an actual implementation.

System 210 may also include an inertial navigation system (INS) for determining a turn rate, velocity, and acceleration for vehicle 200. The INS may be sufficient for stand-alone navigation of vehicle 200 without determining the locations of other vehicles. If system 210 does not have INS (e.g., general aviation (GA) and unmanned vehicles (UVs)), system 210 may include another source of redundant navigation information, such as signals from a base station (e.g., base station 180).

Transceiver 220 may be configured to transmit surveillance message 226 and receive surveillance message 266 from vehicle 260. Surveillance message 226 may include a broadcast of vehicle data, an interrogation message sent to vehicle 260 asking for data about vehicle 260 (e.g., requesting the altitude of vehicle 260), and/or a reply message in response to an interrogation received from vehicle 260. Transceiver 220 may include a Mode S transponder and/or a Mode C transponder. Additionally or alternatively, transceiver 220 can include any other transceiver capable of transmitting and/or receiving surveillance messages, such as a TCAS-equipped transceiver, an ADS-B-equipped transceiver, an AIS-equipped transceiver.

Although transceiver 220 is described herein as a single device for transmitting and receiving messages 226 and 266, transceiver 220 may include multiple devices. For example, transceiver 220 may include a TCAS device configured to transmit interrogation messages and a transponder configured to transmit reply messages in response to received interrogations from TCAS devices.

There may be interference limiting standards limiting the power and interrogation rate of transceiver 220 as a function of the number of other vehicles near vehicle 200 and in the same altitude range as vehicle 200 that are equipped with transceivers transmitting at the same frequency. However, a reduction in power and interrogation rate can effectively reduce the range of transceiver 220. At higher altitudes and higher closure rates, the interference limiting rules may require long surveillance ranges. At lower altitudes or lower closure rates, the interference limiting rules may require shorter surveillance ranges.

In some examples, transceiver 220 has a wider beam than the beamwidths of similar transceivers. A wider surveillance beam reduces the cost of transceiver 220, as compared to other transceivers, and helps maintain a minimum surveillance range. Wider transmit beams use more of the allocated budget for a surveillance message, as set forth in the governing rules. Processing circuitry 230 can use the techniques of this disclosure to reduce the transmission power, thus allowing for the use of a wider beam for transmitting surveillance message 226.

Surveillance messages 226 and 266 can include indicating the position, velocity, altitude, and other information relating to system 210 and vehicles 200 and 260. For example, processing circuitry 230 can determine the location, velocity, track, status, and destination of vehicle 200. In some examples, surveillance messages 226 and 266 include TCAS data, ADS-B data, where each surveillance message lays out the data in an extended squitter format as defined in the applicable standard (e.g., RTCA/DO-260). In examples in which surveillance messages 226 and 266 include TCAS data or ADS-B data, surveillance messages 226 and 266 can encode data at a frequency of 1030 MHz or 1090 MHz. Surveillance messages 226 and 266 can also encode ADS-B data at a frequency of 978 MHz for universal access transceiver (UAT) transmissions. These systems may experience interference from other systems that operate in nearby frequency bands, such as DME, which operates in a band from 1025 MHz to 1150 MHz.

Processing circuitry 230 can determine the estimated closure rate based on the speed of vehicle 200. For example, at altitudes below ten thousand feet in the United States, the estimated maximum closure rate (EMCR) is equal to the speed of vehicle 200 plus the greater of two hundred and fifty knots and the speed of vehicle 200, as shown in Equation (1). Thus, processing circuitry 230 can determine the EMCR without knowing the speed of vehicle 250 by using the speed limit in the United States under ten thousand feet. At altitudes above ten thousand feet, processing circuitry 230 can determine the EMCR based on Equation (2), where OwnSpeed is the speed of vehicle 200 and OwnAltitude is the altitude of vehicle 200.

EMCR=OwnSpeed+MaxOf(OwnSpeed,250) (1)

EMCR=OwnSpeed+MaxOf(OwnSpeed,250+MinOf (350×(OwnAltitude−10000)/8000,350)) (2)

The interference limiting rules can limit the transmission power and rate based on the Required Reliable Surveillance Range (RRSR), which is the product of the Required Surveillance Time (RST) and the EMCR. Table 1 shows example values for the RST as a function of the altitude of vehicle 200.

TABLE I

RST times as a function of the ownship altitude.

| Own Altitude (feet) | RST (seconds) |
|---|---|
| <=4,000 | 32 |
| >4000 and <=14,000 | 37 |
| >14,000 | 42 |

For low EMCR situation such as slow speeds and ground operations, processing circuitry 230 can reduce the maximum power level for surveillance messages transmitted by transceiver 220. In these situations, processing circuitry 230 can also increase the minimum trigger level of transceiver 220 for receiving surveillance messages 266, which desensitizes the receiver. With an increased minimum trigger level, system 210 may not even hear or identify the squitter of the transceiver onboard vehicle 260. Thus, system 210 would not even have to decide whether to interrogate vehicle 260.

Processing circuitry 230 may be configured to decrease the maximum power level for transmitting surveillance message 226 based the number of transmitting vehicles in the proximity of vehicle 200. The number of transmitting vehicles may be defined as the number of vehicles transmitting surveillance messages, such as TCAS or ADS-B. Two possible techniques for decreasing the maximum power level are shown in Equations (3a) and (3b) below, where P(i) represents a maximum power level for transmission of surveillance message 226, NTA represents the number of transmitting vehicles in the vicinity of vehicle 200, and $\alpha$ can be derived from surveillance of TCAS II aircraft and can be used to match Equation (3a) to the measure distribution of nearby TCAS II aircraft. In Equation (3b), PA(k) is for Mode C interrogations only, and B is a beam sharpening factor, which can represent a ratio of interrogation beamwidth to reply beamwidth resulting from interrogation sidelobe suppression. The constant number terms in Equations (3a) and (3b) are merely examples; other values can be used. Equations (3a) and (3b) are similar to the inequality formulas set forth in the interference limiting standards of RTCA-185b.

$$\sum_{i=1}^{I}\left[\frac{P(i)}{250 \text{ watts}}\right] \le \text{the smaller of } \left[\frac{280}{NTA+1}, \frac{11}{\alpha^2}\right] \quad (3a)$$

$$\frac{1}{B}\sum_{k=1}^{K}\left[\frac{PA(k)}{250 \text{ watts}}\right] \le \text{the smaller of } \left[\frac{80}{NTA+1}, 3\right] \quad (3b)$$

In examples in which processing circuitry 230 decreases the maximum power level, processing circuitry 230 may be configured to increase the maximum power level (e.g., reduce the decrease in the maximum power level) in response to determining that the RRSR is greater than a threshold level. For example, processing circuitry 230 can use Equation (4) to determine whether to use the MaxLimit, as determined using Equations (3a) or (3b), or to increase the maximum power level above the level of MaxLimit. In Equations (4) and (5), a positive value represents in a reduction in the maximum power level, rather than an absolute value of the maximum power level.

$$\text{Reduction based on } RRSR = -20 \times \log_{10} \frac{RRSR}{14} \quad (4)$$

$$\text{Reduction in max power level} = \quad (5)$$
$$\text{Min}Of\left(-20 \times \log_{10} \frac{RRSR}{14}, \text{ or Max}Limit\right)$$

Using Equation (5), processing circuitry 230 can determine whether to use MaxLimit or a lower reduction based on the RRSR. Thus, even when the interference limiting algorithm or standards mandate or suggest a first reduction in transmission power, processing circuitry 230 may be configured to apply a second reduction to the maximum power level, when a magnitude of the second reduction is less than a magnitude of the first reduction. Processing circuitry 230 may be configured to determine the second reduction based on the speed and/or altitude of vehicle 200, the closure rate of vehicle 200, the surveillance time of vehicle 200, and/or the surveillance range of vehicle 200.

In examples in which vehicles 200 and 260 are aircraft with Mode S transponders, vehicles 200 and 260 may be configured to periodically transmit surveillance messages 226 and 266 containing the Mode S address at 1030 MHz, which is called a TCAS broadcast. Processing circuitry 230 can use the received messages from other vehicles to estimate the number of equipped vehicles in the area. TCAS I, defined in RTCA/DO-197, does not mandate a TCAS broadcast because TCAS I is power-limited. In some examples, processing circuitry 230 can eliminate the TCAS broadcast transmission by transceiver 220 (even for TCAS II system) in response to determining that the power output of active interrogations sent by transceiver 220 is less than the allowed power output according to the TCAS I requirements specified in DO-197.

Processing circuitry 230 may implement an interference limiting algorithm to the control how much transmit budget is allocated to transceiver 220. The more vehicles in an area that are transmitting surveillance messages, the less transmit budget should be allocated to each vehicle, which will reduce the surveillance range of all vehicles in the area. In examples in which there are many equipped vehicles in an area, the surveillance range of all of the vehicles is adversely impacted. One example is in the area around airports, where a shorter range may be acceptable.

However, the number of urban air mobility (UAM) vehicles has increased recently. If all of the UAM vehicles become equipped with surveillance transceivers, it would be detrimental to the surveillance range of vehicles traditionally equipped with surveillance transceivers.

Positioning device 240 is configured to determine the position or location of vehicle 200. Positioning device 240 may include satellite navigation equipment such as a GNSS configured to receive positioning signals from satellites and other transmitters. One example of a GNSS is a Global Positioning System (GPS). Positioning device 240 may be configured to deliver the received positioning signals to processing circuitry 230, which may be configured to determine the position of vehicle 200. Processing circuitry 230 can encode the position and/or velocity in surveillance message 226 transmitted by transceiver 220.

Memory 250 may be configured to store data indicating the locations, velocities, and other navigational data for vehicles 200 and 260. In some examples, memory 250 may store program instructions, which may include one or more program modules, which are executable by processing circuitry 230. When executed by processing circuitry 230, such program instructions may cause processing circuitry 230 to provide the functionality ascribed to it herein. The program instructions may be embodied in software and firmware. Memory 250 may include any volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital media.

Vehicle 260 is equipped with a transmitter for transmitting surveillance message 266. For example, vehicle 260 may have a Mode S transponder or an ADS-B Out transmitter for transmitting surveillance message 266 signals indicating the position and velocity of vehicle 260. Vehicle 260 can encode the location and velocity of vehicle 260 in a surveillance message. Vehicle 260 can transmit the surveillance message as surveillance signals 266. Processing circuitry 230 may be configured to determine the speed, altitude, and position of vehicle 260 based on surveillance message 266 received by transceiver 220.

The risk of congestion at the frequency of surveillance signals 226 can be mitigated by a combination of techniques. These techniques include reducing the transmission power or the broadcast frequency for low-altitude operations because vehicles operating at low altitudes are often operating at lower speeds than high-altitude vehicles. Given the lower speeds that are common at low altitudes, it may be sufficient to detect other vehicles at shorter ranges, as compared to higher altitudes.

Figure 3:
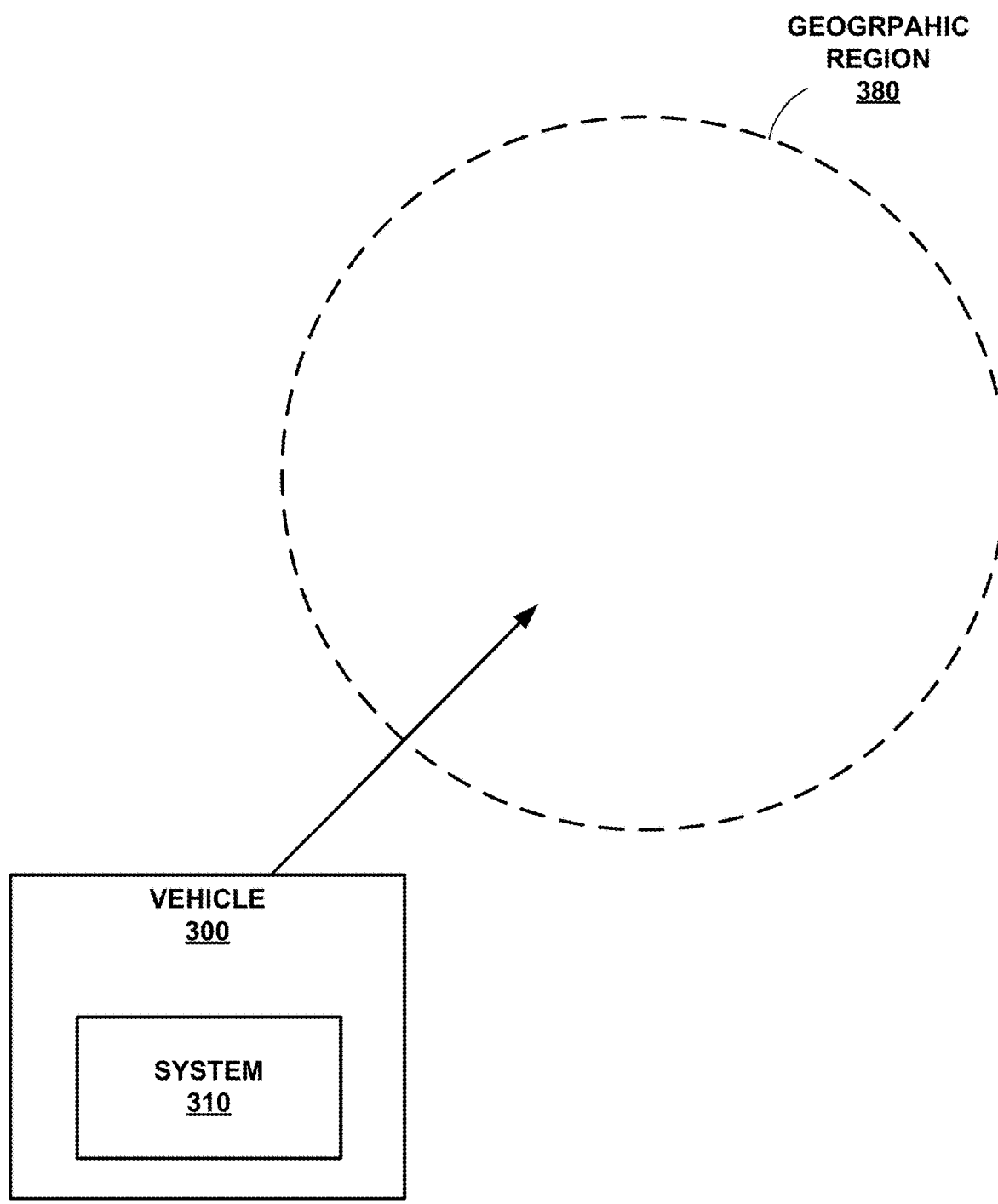
FIG. 3 is a conceptual block diagram of a vehicle entering a geographic region, in accordance with some examples of this disclosure.

FIG. 3 is a conceptual block diagram of a vehicle 300 entering a geographic region 380, in accordance with some examples of this disclosure. Geographic region 380 can be any jurisdictional area, such as a nation, state, or province where vehicle 300 and system 310 should operate based on the rules for the jurisdictional area. For example, geographic region 380 may be the airspace for the United States, Canada, or the European Union.

System 310 can determine whether vehicle 300 is located in geographic region 380 and operate in accordance with the rules for geographic region 380. In the example shown in FIG. 3, system 310 may determine that vehicle 300 is located in geographic region 380 and cause system 310 to reduce the maximum power level for transmitting surveillance messages. For example, if vehicle 300 is flying below an altitude ten thousand feet and enters the airspace of the United States, system 310 can reduce the maximum power level for transmitting surveillance messages. Additionally or alternatively, system 310 can increase the minimum trigger level used to filter received signals in response to determining that vehicle 300 is located in geographic region 380.

Based on determining that vehicle 300 is located in geographic region 380, system 310 can choose the technique for determining EMCR. For example, certain states or countries have different assumptions of the ownship speed that system 310 can use. In addition, system 310 can use the data in surveillance messages to estimate the "enforced speed" of geographic region 380. In examples in which vehicle 300 is located in geographic region 380 and all nearby vehicles are travelling at less than three hundred knots, system 310 can assume that the enforced speed is three hundred knots.

Figure 4:
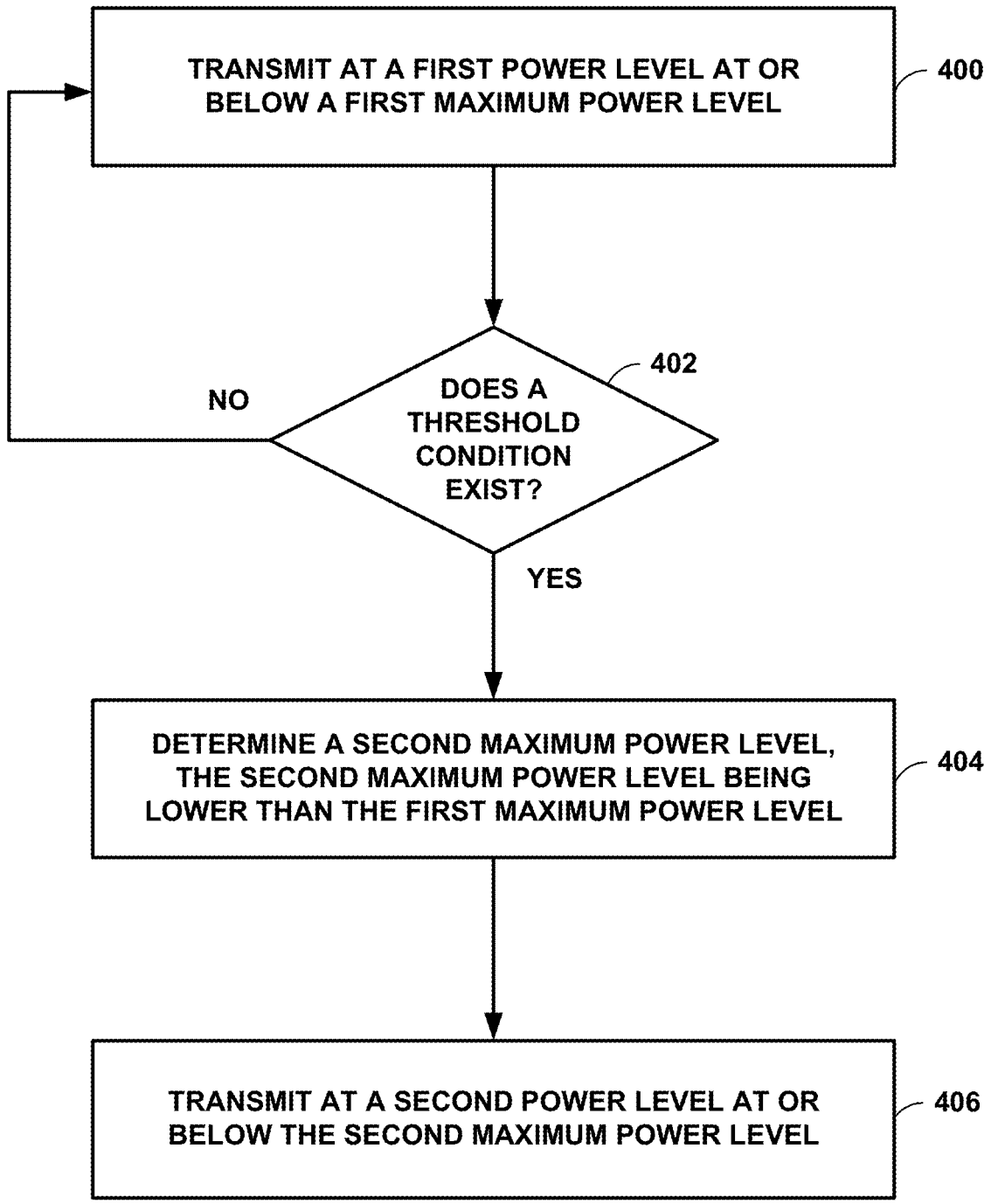
FIG. 4 is a flowchart illustrating an example process for determining a maximum power level for transmitting surveillance signals, in accordance with some examples of this disclosure.

FIG. 4 is a flowchart illustrating an example process for determining a maximum power level for transmitting surveillance signals, in accordance with some examples of this disclosure. The example processes of FIGS. 4-7 are described with reference to system 210 shown in FIG. 2, although other components such as vehicle 100 shown in FIG. 1, may exemplify similar techniques.

In the example of FIG. 4, transceiver 220 transmits surveillance message 226 at a first power level at or below a first maximum power level (400). The first maximum power level may be a standard operating maximum power level for surveillance message 226. Processing circuitry 230 then determines whether a threshold condition exists (402). In response to determining that no threshold condition exists, processing circuitry 230 continues causing transceiver 220 to transmit surveillance message 226 at or below the first maximum power level.

In the example of FIG. 4, processing circuitry 230 determines a second maximum power level in response to determining that the threshold condition exists (404). The second maximum power level is lower than the first maximum power level. Thus, processing circuitry 230 lowers the transmission power in response to the existence of a threshold condition. In the example of FIG. 4, transceiver 220 transmits surveillance message 226 at the second power level at or below the second maximum power level (406).

FIG. 4 describes changing the maximum power level for transmission in response to determining that a threshold condition exists. Additionally or alternatively, processing circuitry 230 may reduce the transmission rate for surveillance message 226 in response to determining that the threshold condition exists. Accordingly, processing circuitry 230 can reduce only the transmission rate or both the transmission power and transmission rate in response to determining that a threshold condition exists. The transmission rate refers to how often transceiver 220 transmits surveillance message 226 (e.g., 0.1, 0.2, 0.5, 1.0, or 2.0 Hz).

In some examples, processing circuitry 230 may be configured to determine whether two or more threshold conditions exist. In response to determining that two or more threshold conditions exist, processing circuitry 230 may be configured to determine a third maximum power level, where the third maximum power level is lower than the first and second maximum power levels for situations when zero or only one threshold conditions are determined.

For example, processing circuitry 230 can determine that a speed of ownship vehicle 200 is below a threshold speed and that an altitude of ownship vehicle 200 is less than a threshold altitude (e.g., that ownship vehicle 200 is flying low and slow or that ownship vehicle 200 is on the ground). In response to determining that two threshold conditions exist, processing circuitry 230 may be configured to cause transceiver 220 to transmit at a power level less than the third maximum power level. Processing circuitry 230 may be configured to reduce the maximum power level even when the interference limiting standards mandate no reduction or a smaller reduction. In other words, processing circuitry 230 can force a greater reduction in power and/or a greater reduction in transmission rate when two or more threshold conditions exist, as compared to when only one threshold condition exists.

Figure 5:
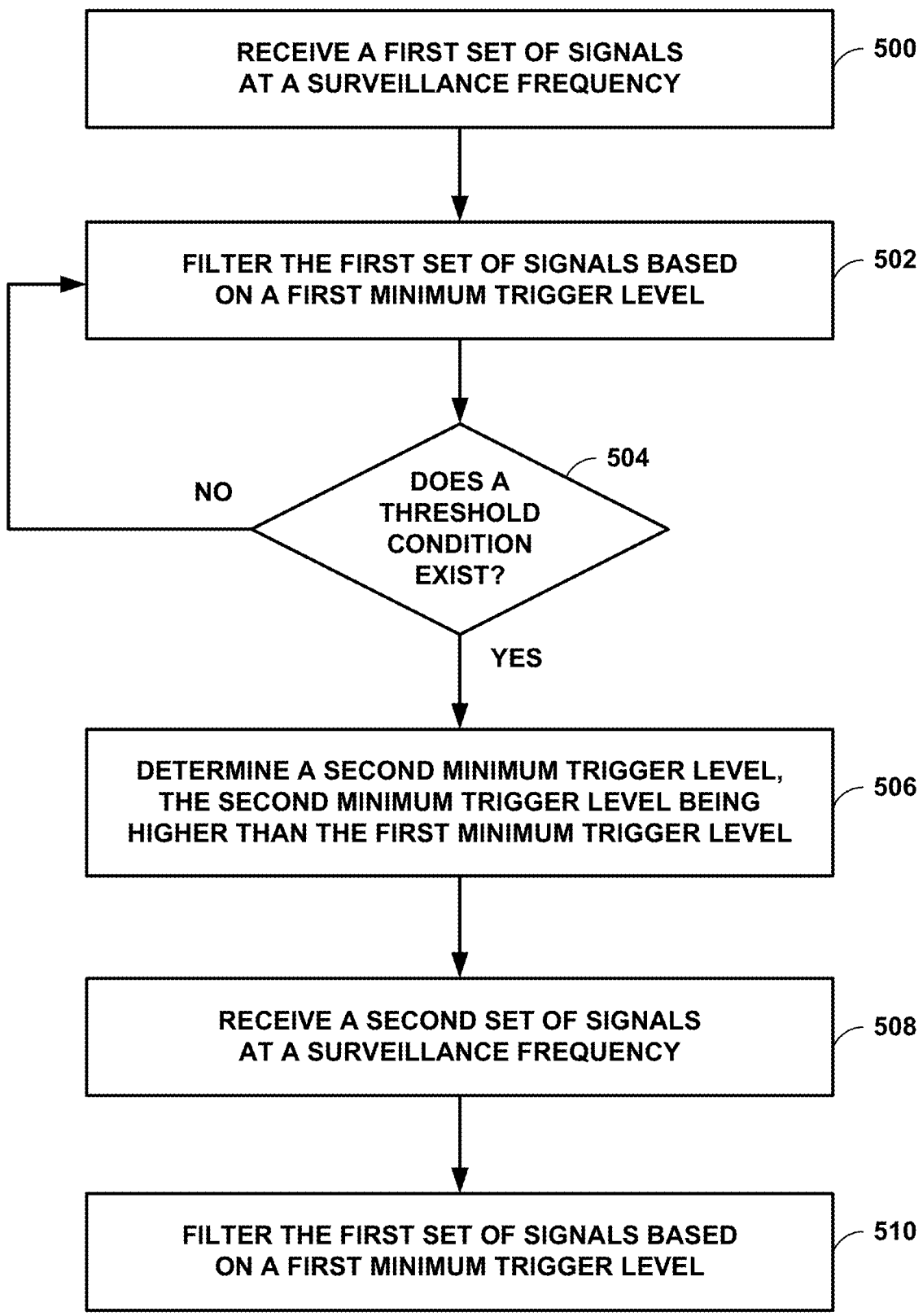
FIG. 5 is a flowchart illustrating an example process for determining a minimum trigger level for filtering received surveillance signals, in accordance with some examples of this disclosure.

FIG. 5 is a flowchart illustrating an example process for determining a minimum trigger level for filtering received surveillance signals, in accordance with some examples of this disclosure. In the example of FIG. 5, transceiver 220 receives a first set of signals at a surveillance frequency (500). The first set of signals can include surveillance message 266, as well as surveillance messages from other vehicles. Processing circuitry 230 then filters the first set of signals based on a first minimum trigger level (502). Processing circuitry 230 parses the first set of signals to extract surveillance message 266 from the other messages or signals at the same frequency.

In the example of FIG. 5, processing circuitry 230 determines whether a threshold condition exists (504). In response to determining that no threshold condition exists, processing circuitry 230 continues filtering signals based on the first minimum trigger level. In the example of FIG. 5, processing circuitry 230 determines a second minimum trigger level in response to determining that the threshold condition exists (506). The second minimum trigger level is higher than the first minimum trigger level.

In the example of FIG. 5, transceiver 220 receives a second set of signals at a surveillance frequency (508). Processing circuitry 230 filters the second set of signals based on the second minimum trigger level (510). By increasing the minimum trigger level for filtering received signals, processing circuitry 230 may not identify surveillance message 266 in the second set of signals, especially if vehicle 260 is far away from vehicle 200. Thus, processing circuitry 230 may not cause transceiver 220 to reply to surveillance message 266, thereby reducing the interference with other surveillance messages.

In response to determining that two or more threshold conditions exist, processing circuitry 230 may be configured to determine a third minimum trigger level, where the third minimum trigger level is higher than the first and second minimum trigger level. For example, processing circuitry 230 can determine that a speed of ownship vehicle 200 is below a threshold speed and that an altitude of ownship vehicle 200 is less than a threshold altitude (e.g., that ownship vehicle 200 is flying low and slow or that ownship vehicle 200 is on the ground). In response to determining that two threshold conditions exist, processing circuitry 230 may be configured to filter surveillance signals based on the third minimum trigger level. In other words, processing circuitry 230 can force a greater increase in the filter threshold when two or more threshold conditions exist, as compared to when only one threshold condition exists.

Figure 6:
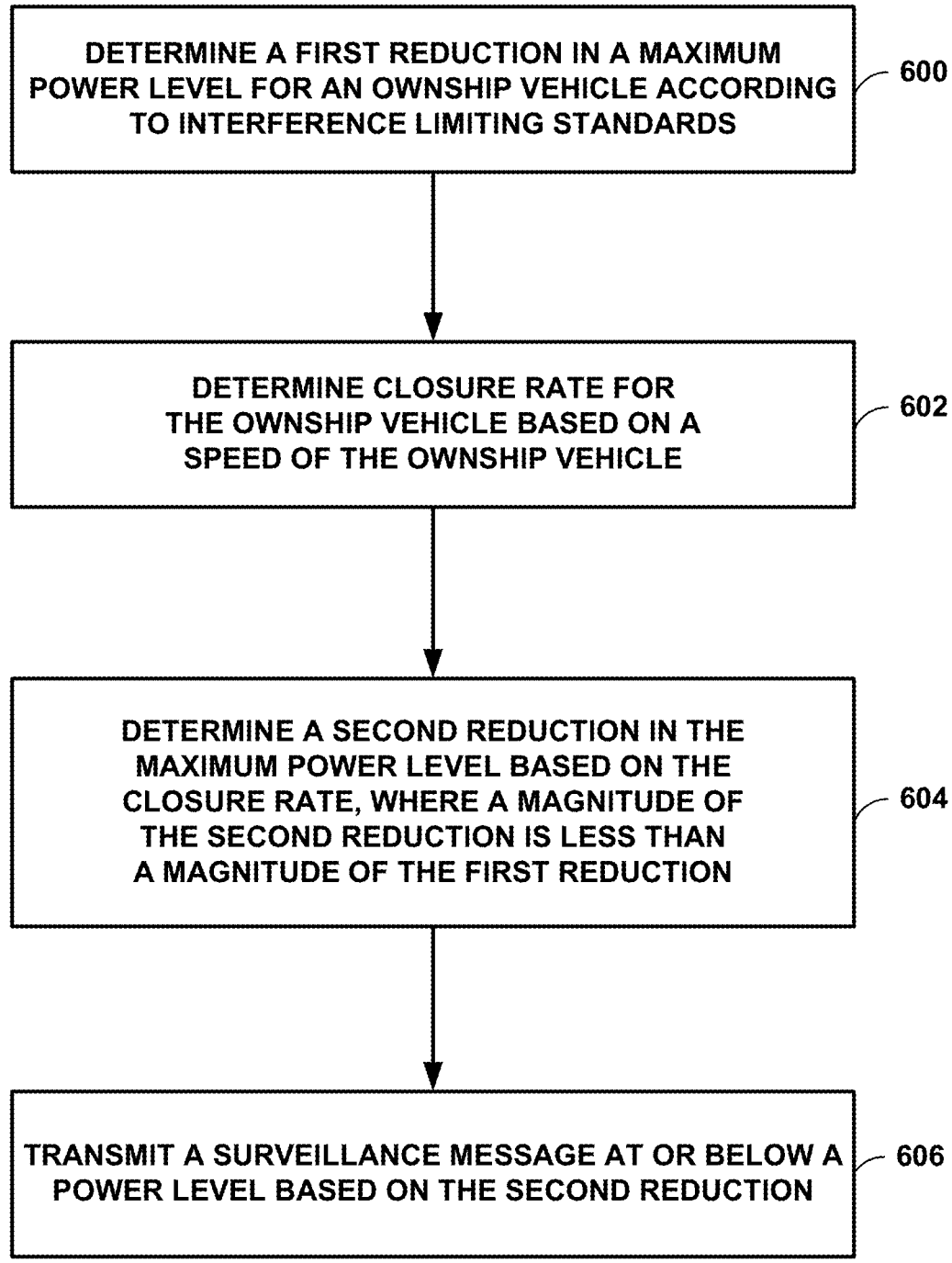
FIG. 6 is a flowchart illustrating an example process for deviating from interference limiting standards in response to determining a higher maximum power level is required or needed based on a closure rate, in accordance with some examples of this disclosure.

FIG. 6 is a flowchart illustrating an example process for deviating from interference limiting standards in response to determining a higher maximum power level is required or needed based on a closure rate, in accordance with some examples of this disclosure. In the example of FIG. 6, processing circuitry 230 determines a first reduction in a maximum power level for vehicle 200 according to the interference limiting standards (600). For example, the interference limiting standards may mandate that the maximum power level should be reduced based on the number of transmitting vehicles in the vicinity of vehicle 200. The interference limiting standards may include a maximum reduction, such that the maximum power level cannot be reduced below a lower bound. The maximum reduction may be seven decibels for Mode C surveillance and ten decibels for Mode S surveillance. The power level of a surveillance transmission may be expressed in terms of the total radiated power of all interrogations over a period of time.

In the example of FIG. 6, processing circuitry 230 determines a closure rate for vehicle 200 (602). Processing circuitry 230 may be configured to determine the closure rate based on the speed and altitude of vehicle 200, as shown in Equations (1) and (2) above. Processing circuitry 230 may be configured to also determine a surveillance range for vehicle 200 based on the closure rate and a surveillance time (see, e.g., Table I above). Processing circuitry 230 may be configured to then determine a second reduction in the maximum power level, where the second reduction is less than the first reduction (604). Processing circuitry 230 can determine the second reduction using Equation (4) above.

In response to determining that the second reduction is less than the first reduction, processing circuitry 230 causes transceiver 220 to transmit surveillance message 226 at or below the maximum power level set based on the second reduction (606). Thus, processing circuitry 230 may be configured to deviate from the interference limiting standards by determining a smaller reduction based on the closure rate. The safety of vehicles 200 and 260 may be promoted by maintaining a higher maximum power level that what is mandated by the interference limiting standards, so that vehicle 200 can make vehicle 260 aware of the position of vehicle 200. The closure rate and the surveillance range can provide an indication of when the benefits of using a higher power level might outweigh the possible interference caused by the higher power level.

Figure 7:
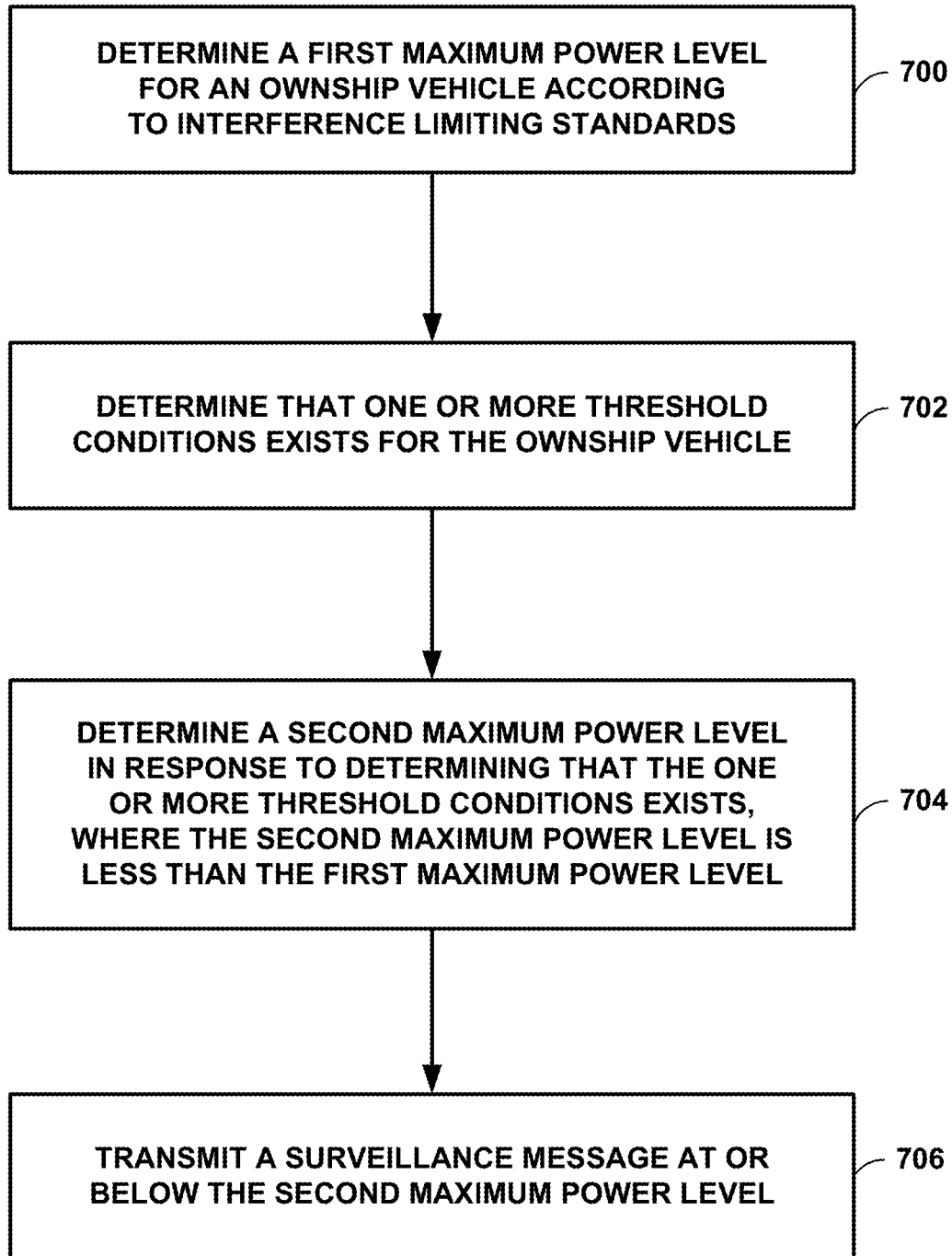
FIG. 7 is a flowchart illustrating an example process for enhancing the interference limiting standards in response to determining one or more threshold conditions exist, in accordance with some examples of this disclosure.

FIG. 7 is a flowchart illustrating an example process for enhancing the interference limiting standards in response to determining one or more threshold conditions exist, in accordance with some examples of this disclosure. In the example of FIG. 7, processing circuitry 230 determines a first maximum power level for vehicle 200 according to the interference limiting standards (700). Processing circuitry may be configured to also determine that one or more threshold conditions exist for vehicle 200 (702). These threshold conditions can be based on, for example, the speed and/or altitude of vehicle 200, the geographic region or jurisdiction in which vehicle 200 is located, and/or the speeds of vehicles (e.g., vehicle 260) near vehicle 200.

In response to determining that the one or more threshold conditions exist, processing circuitry 230 determines a second maximum power level that is less than the first maximum power level (704). Processing circuitry 230 then transmits surveillance message 226 at or below the second maximum power level (706). Thus, processing circuitry 230 may be configured to enhance the interference limiting standards by determining a lower maximum power level because of the threshold condition(s). The interference caused by transmitting surveillance message 226 may be further reduced by enhancing the reductions mandated by the interference limiting standards. For example, there may be situations in which vehicle 200 is traveling low and slow when low-power transmissions may be sufficient.

Example 1

A method includes transmitting, by a transceiver onboard an ownship vehicle, a first surveillance message at a first power level at or below a first maximum power level. The method also includes determining, by processing circuitry onboard the ownship vehicle, that a threshold condition exists and determining, by the processing circuitry, a second maximum power level in response to determining that the threshold condition exists, the second maximum power level being lower than the first maximum power level. The method further includes transmitting, by the transceiver, a second surveillance message at a second power level at or below the second maximum power level after determining that the threshold condition exists.

Example 2

A method includes receiving, by a receiver onboard an ownship vehicle, a first set of signals at a surveillance frequency. The method also includes filtering, by processing circuitry onboard the ownship vehicle, the first set of signals based on a first minimum trigger level and determining, by the processing circuitry, that a threshold condition exists. The method further includes determining, by the processing circuitry, a second minimum trigger level in response to determining that the threshold condition exists, the second minimum trigger level being higher than the first minimum trigger level. The method includes receiving, by the receiver, a second set of signals at the surveillance frequency. The method also includes filtering, by the processing circuitry, the second set of signals based on a second minimum trigger level after determining that the threshold condition exists.

Example 3

The method of example 1 or example 2, where determining that the threshold condition exists comprises determining that a speed of the ownship vehicle is less than a threshold speed or that an altitude of the ownship vehicle is less than a threshold altitude.

Example 4

The method of examples 1-3 or any combination thereof, where determining that the threshold condition exists comprises determining that the ownship vehicle is located in a particular geographic region.

Example 5

The method of examples 1-4 or any combination thereof, where determining that the threshold condition exists comprises determining that speeds of vehicles near the ownship vehicle are less than a threshold speed.

Example 6

The method of example 5, further including receiving at least one surveillance message indicating the speeds of the vehicles near the ownship vehicle.

Example 7

The method of examples 1-6 or any combination thereof, further including determining a maximum power level according to interference limiting standards that is lower than the first power level and higher than the second maximum power level.

Example 8

A system includes a transceiver and processing circuitry configured to perform the method of examples 1-7 or any combination thereof.

Example 9

A device includes a computer-readable medium having executable instructions stored thereon, configured to be executable by processing circuitry for causing the processing circuitry to cause a transceiver to transmit a first surveillance message at a first power level at or below a first maximum power level. The instructions are also configured to cause the processing circuitry to determine that a threshold condition exists and determine a second maximum power level in response to determining that the threshold condition exists, the second maximum power level being lower than the first maximum power level. The instructions are further configured to cause the processing circuitry to cause the transceiver to transmit a second surveillance message at a second power level at or below the second maximum power level after determining that the threshold condition exists.

Example 10

A device includes a computer-readable medium having executable instructions stored thereon, configured to be executable by processing circuitry for causing the processing circuitry to filter a first set of signals received from a transceiver based on a first minimum trigger level and determine that a threshold condition exists. The instructions are also configured to cause the processing circuitry to determine a second minimum trigger level in response to determining that the threshold condition exists, the second minimum trigger level being higher than the first minimum trigger level. The instructions are further configured to cause the processing circuitry to filter a second set of signals received from the transceiver based on a second minimum trigger level after determining that the threshold condition exists.

Example 11

The device of example 9 or example 10, where the instructions are configured to cause the processing circuitry to perform the method of examples 1-7 or any combination thereof.

Example 12

A system includes means for transmitting a first surveillance message at a first power level at or below a first maximum power level. The device also includes means for determining that a threshold condition exists and means for determining a second maximum power level in response to determining that the threshold condition exists, the second maximum power level being lower than the first maximum power level. The device further includes means for transmitting a second surveillance message at a second power level at or below the second maximum power level after determining that the threshold condition exists.

Example 13

A system includes means for receiving a first set of signals at a surveillance frequency and means for filtering the first set of signals based on a first minimum trigger level. The device also includes means for determining that a threshold condition exists and means for determining a second minimum trigger level in response to determining that the threshold condition exists, the second minimum trigger level being higher than the first minimum trigger level. The device further includes means for receiving a second set of signals at the surveillance frequency and means for filtering the second set of signals based on a second minimum trigger level after determining that the threshold condition exists.

Example 14

The system of example 12 or example 13, where the means for determining that the threshold condition exists comprise means for determining that a speed of the ownship vehicle is less than a threshold speed or that an altitude of the ownship vehicle is less than a threshold altitude.

Example 15

The system of examples 12-14 or any combination thereof, where the means for determining that the threshold condition exists comprise means for determining that the ownship vehicle is located in a particular geographic region.

Example 16

The system of examples 12-15 or any combination thereof, where the means for determining that the threshold condition exists comprise means for determining that speeds of vehicles near the ownship vehicle are less than a threshold speed.

Example 17

The system of examples 12-16 or any combination thereof, further including means for receiving at least one surveillance message indicating the speeds of the vehicles near the ownship vehicle.

Example 18

A method includes transmitting, by a transceiver onboard an ownship vehicle, a first surveillance message at a first power level at or below a first maximum power level. The method also includes determining, by processing circuitry onboard the ownship vehicle, a first reduction in the first maximum power level for the ownship vehicle according to interference limiting standards. The method further includes determine a closure rate for the ownship vehicle based on a speed of the ownship vehicle. The method includes determine a second reduction in the first maximum power level for the ownship vehicle based on the closure rate, wherein a magnitude of the second reduction is less than a magnitude of the first reduction. The method also includes determine a second maximum power level based on the second reduction. The method further includes transmitting, by the transceiver, a second surveillance message at a second power level at or below the second maximum power level after determining that the threshold condition exists.

Example 19

The method of example 18, further including determining the closure rate based on the speed and an altitude of the ownship vehicle.

Example 20

The method of example 18 or example 19, where determining the first reduction is based on a number of transmitting vehicles in an area around the ownship vehicle.

Example 21

A system including a transceiver and processing circuitry configured to perform the method of examples 18-20 or any combination thereof.

The disclosure contemplates computer-readable storage media including instructions to cause a processor to perform any of the functions and techniques described herein. The computer-readable storage media may take the example form of any volatile, non-volatile, magnetic, optical, or electrical media, such as a random access memory (RAM), read-only memory (ROM), non-volatile random access memory (NVRAM), electrically erasable programmable read-only memory (EEPROM), or flash memory. The computer-readable storage media may be referred to as non-transitory.

The techniques described in this disclosure, including those attributed to vehicles 100, 200, and 300, system 210, transceiver 220, processing circuitry 230, positioning device 240, and/or memory 250, and various constituent components, may be implemented, at least in part, in hardware, software, firmware or any combination thereof. For example, various aspects of the techniques may be implemented within one or more processors, including one or more microprocessors, digital signal processors (DSPs), application-specific integrated circuit (ASICs), field-programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry.

As used herein, the term "circuitry" refers to an ASIC, an electronic circuit, a processor (shared, dedicated, or group) and memory that execute one or more software or firmware programs, a combinational logic circuit, or other suitable components that provide the described functionality. The term "processing circuitry" refers one or more processors distributed across one or more devices. For example, "processing circuitry" can include a single processor or multiple processors on a device. "Processing circuitry" can also include processors on multiple devices, where the operations described herein may be distributed across the processors and devices.

Such hardware, software, firmware may be implemented within the same device or within separate devices to support the various operations and functions described in this disclosure. For example, any of the techniques or processes described herein may be performed within one device or at least partially distributed amongst two or more devices, such as between vehicles 100, 200, and 300, system 210, transceiver 220, processing circuitry 230, positioning device 240, and/or memory 250. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in an article of manufacture including a non-transitory computer-readable storage medium encoded with instructions. Instructions embedded or encoded in an article of manufacture including a non-transitory computer-readable storage medium encoded, may cause one or more programmable processors, or other processors, to implement one or more of the techniques described herein, such as when instructions included or encoded in the non-transitory computer-readable storage medium are executed by the one or more processors. Example non-transitory computer-readable storage media may include RAM, ROM, programmable ROM (PROM), EPROM, EEPROM, flash memory, a hard disk, a compact disc ROM (CD-ROM), a floppy disk, a cassette, magnetic media, optical media, or any other computer readable storage devices or tangible computer readable media.

In some examples, a computer-readable storage medium includes non-transitory medium. The term "non-transitory" may indicate that the storage medium is not embodied in a carrier wave or a propagated signal. In certain examples, a non-transitory storage medium may store data that can, over time, change (e.g., in RAM or cache). Elements of devices and circuitry described herein, including, but not limited to, vehicles 100, 200, and 300, system 210, transceiver 220, processing circuitry 230, positioning device 240, and/or memory 250, may be programmed with various forms of software. The one or more processors may be implemented at least in part as, or include, one or more executable applications, application modules, libraries, classes, methods, objects, routines, subroutines, firmware, and/or embedded code, for example.

Various examples of the disclosure have been described. Any combination of the described systems, operations, or functions is contemplated. These and other examples are within the scope of the following claims.

What is claimed is:

1. A system configured to mount on an ownship vehicle, the system comprising:
   processing circuitry configured to:
     determine a first maximum power level according for the ownship vehicle according to interference limiting standards;
     determine, based on a parameter of the ownship vehicle, that a threshold condition exists; and
     determine a second maximum power level in response to determining that the threshold condition exists, the second maximum power level being lower than the first maximum power level; and
   a transceiver configured to transmit, in response to the processing circuitry determining that the threshold condition exists, a surveillance message at a power level at or below the second maximum power level.

2. The system of claim 1,
   wherein the processing circuitry is further configured to:
     determine that, based on the parameter of the ownship vehicle, two or more threshold conditions exist; and
     determine a third maximum power level in response to determining that the two or more threshold conditions exist, the third maximum power level being lower than the first and second maximum power levels,
   wherein the transceiver is configured to transmit, in response to the processing circuitry determining that the two or more threshold conditions exist, a second surveillance message at a second power level at or below the third maximum power level.

3. The system of claim 1,
   wherein the transceiver includes a TCAS II transmitter, and wherein the processing circuitry is further configured to:
determine that a power output of the TCAS II transmitter is less than a power output allowed by applicable requirements for a TCAS I system; and
suppress TCAS broadcast interrogations transmitted by the transceiver in response to determining that the power output of the TCAS II transmitter is less than the power output allowed by applicable requirements for the TCAS I system.

4. The system of claim 1, wherein the parameter of the ownship vehicle comprises a speed of the ownship vehicle, and wherein the processing circuitry is configured to determine that the threshold condition exists by determining that the speed of the ownship vehicle is less than a threshold speed.

5. The system of claim 4, wherein the parameter of the ownship vehicle further comprises an altitude of the ownship vehicle, and wherein the processing circuitry is configured to determine that the threshold condition exists by further determining that the altitude of the ownship vehicle is less than a threshold altitude.

6. The system of claim 1, wherein the parameter of the ownship vehicle comprises a geographic location of the ownship vehicle, and wherein the processing circuitry is configured to determine that the threshold condition exists by determining that the ownship vehicle is located in a particular geographic region.

7. The system of claim 1, wherein the processing circuitry is configured to determine that the threshold condition exists by determining that speeds of vehicles near the ownship vehicle are less than a threshold speed.

8. The system of claim 7, wherein the processing circuitry is configured to determine that the speeds of the vehicles near the ownship vehicle are less than the threshold speed by determining that a maximum speed of the vehicles near the ownship vehicle is less than the threshold speed.

9. The system of claim 7, wherein the processing circuitry is configured to determine that the speeds of the vehicles near the ownship vehicle are less than the threshold speed by determining that an average speed of the vehicles near the ownship vehicle is less than the threshold speed.

10. The system of claim 7, wherein the processing circuitry is configured to classify, based on a speed of the ownship vehicle, vehicles as near the ownship vehicle for purposes of determining whether the speeds of the vehicles near the ownship vehicle are less than the threshold speed.

11. The system of claim 7,
wherein the transceiver is configured to receive at least one surveillance message indicating a speed of one of the vehicles near the ownship vehicle,
wherein the processing circuitry is configured to determine the speed of one of the vehicles near the ownship vehicle based on the at least one surveillance message, and
wherein the processing circuitry is configured to use the speed, as determined based on the at least one surveillance message, to determine that the speeds of the vehicles near the ownship vehicle are less than the threshold speed.

12. The system of claim 1, wherein to determine the second maximum power level in response to determining that the threshold condition exists, the processing circuitry is configured to determine the second maximum power level irrespective of a number of other vehicles within an area around the ownship vehicle.

\* \* \* \* \*